United States Patent Office 3,325,646
Patented June 13, 1967

3,325,646
ELECTRO-OPTICAL COMMUNICATION
SYSTEM
Paul Reichel, New York, N.Y., and Joseph A. Giordmaine, Millington, N.J., assignors to Fairchild Camera and Instrument Corporation, a corporation of Delaware
Filed July 25, 1962, Ser. No. 212,263
1 Claim. (Cl. 250—199)

This invention relates to electro-optical communication systems and, while it is of general application, it is particularly useful in communication by high-intensity light beams generated by optical masers.

Heretofore, it has been proposed to use modulated light beams in communication systems. The modulation of such light beams is generally based upon the properties of certain materials which vary the polarization parameters of a light beam travelling therethrough under the influence of an electric field, the principle of the well-known Kerr cell as well as of the linear solid-state electro-optic effect. However, there have been serious practical difficulties in effecting a high percentage modulation of the light beam at U.H.F. and microwave frequencies with prior structure geometries of practical dimensions and electrical modulating fields of practical intensities.

The present invention is directed to an electro-optical communication system including a modified form of electro-optical modulator which makes it possible to obtain a satisfactory percentage modulation with physical structures of practical size and modulating fields of reasonable intensities.

It is an object of the invention, therefore, to provide a new and improved electro-optical communication system capable of developing a high percentage modulation of a light beam with a structure of reasonable dimensions and, in particular, with a modulating field of reasonable intensity.

It is a further object of the invention to provide a new and improved electro-optical modulator suitable for use in the communication system of the invention.

In accordance with the invention, there is provided in an electro-optical communication system, an electro-optical modulator comprising an elongated plate-like body of solid-state transparent material having birefrigence which varies with variations of an applied electric field, a pair of parallel plane surfaces, one at either end of such body, opaque conductive reflecting electrodes covering the plane surfaces, each having a window therein, means for directing a substantially parallel beam of light into the body through one of its windows at a slight inclination to one of its index ellipsoid axes and to the plane surfaces, whereby an entrant light beam undergoes multiple reflections by the plane surfaces before emerging from the body through the other of its windows, and input terminals for applying an electric signal to the electrodes varying in time in accordance with a desired modulating signal.

For a better understanding of the present invention, together with other and further objects thereof, reference is had to the following description taken in connection with the accompanying drawings, while its scope will be pointed out in the appended claim.

Referring now to the drawings:

FIG. 3 is a schematic representation of a further modified form of electro-optical modulator including the feature of multiple reflections of the modulated beam, while

Figure 1:
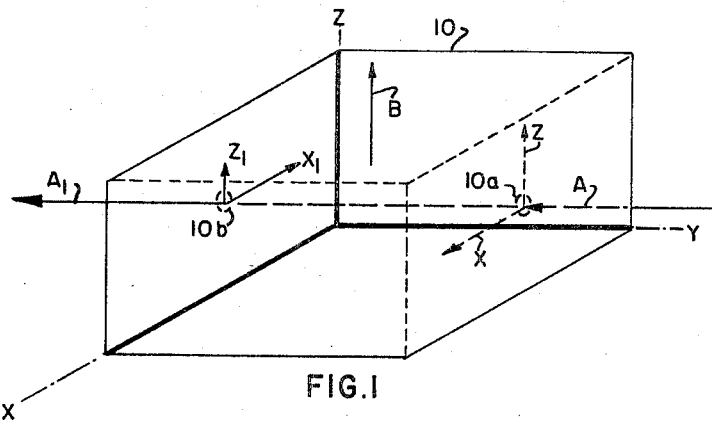
FIG. 1 is a schematic representation of an electro-optical modulator to aid in an explanation of the invention.

Before describing the physical apparatus embodying the electro-optical modulator of the invention, it is believed that it would be helpful to discuss certain basic characteristics of such modulators. The term "electro-optical modulator" is used herein and in the appended claim to refer to a device which, by means of varying electric modulating fields, varies the polarization parameters of a beam of light passing therethrough. Typically, a plane-polarized light beam entering such a device emerges as an elliptically polarized beam, the eccentricity and orientation of the polarization varying with the strength of the electric modulating field. For example, under conventional operating techniques, such a plane-polarized beam emerging from the device is unchanged at zero electric field but is plane-polarized at 90° to the original direction at maximum electric field, with a continuum of elliptical polarizations resulting as the electric field varies through intermediate strengths. Plane-polarization may be considered as elliptical polarization of infinite eccentricity.

An electro-optical modulator includes a body of material which, in the presence of the modulating electric field, splits an entering beam of plane-polarized light into two component beams of mutually perpendicular plane-polarizations which travel in the same direction at different phase velocities. That is, in the presence of an electric field, the material is doubly refracting or birefringent. In particular, the difference in the phase velocities of the two component beams varies with the modulating field so that the net resultant beam emerging from the modulator is of a varying elliptical polarization.

Electro-optical modulators may utilize the square-law electro-optical effect, also known as the Kerr effect, in which variations in phase velocity are proportional to the square of the modulating electric field. This effect occurs both in solids and liquids but magnitudes adequate for practical application have generally been obtained only in certain liquids. Alternatively, such modulators may utilize the linear electro-optical effect in which variations in phase velocities of the two component light beams are proportional to the first power of the electric field. The linear effect occurs only in certain solid materials. Examples of materials in which the linear-law effect is of a magnitude having practical significance as well as adequate response to high-frequency modulating fields are crystalline potassium dihydrogen phosphate (KDP) and ammonium dihydrogen phosphate (ADP).

The present invention differs from prior electro-optical light modulators in several respects, among which may be mentioned: First, in the case of solid-state linear electro-optical cells, the light beam may be passed through the cell perpendicular to the modulating electric field, whereas, in prior devices, it has been parallel to the modulating field. Secondly, the light beam may be multiply reflected across the electro-optical cell in either the liquid-state or solid-state case and, in the solid-state case, either with the beam essentially parallel or perpendicular to the modulating field. An electro-optical modulator embodying either or both of these features has a lower modulating field energy dissipation per unit volume, that is less intense heating, in the modulating material and a lower power is required for the modulating electric field. These characteristics are important for practical communication purposes involving a high information rate.

While certain features of the present invention are applicable to electro-optical materials exhibiting both linear-law and square-law effects, by way of example the invention will be specifically described as utilizing solid-state KDP operated in the linear-law mode. The basic geometry of the relative configurations between the crystal axes, the modulating field, and the light beam for the case of the linear electro-optical effect in KDP is illustrated in FIG. 1. In FIG. 1, the axes X, Y, Z are the principal axes of the index ellipsoid, where the Z axis is the uniaxial optical axis of the body 10 of KDP at zero modulating field. In prior electro-optical modulators of this type, both the light beam and the modulating field were parallel to the Z axis of the electro-optical crystal.

In operation of the elemental electro-optical body of FIG. 1 in the mode described, it will be assumed that a light beam A is directed to the electro-optical body 10 in the region 10a, traversing the body 10 and emerging as the beam $A_1$. It will be seen that the beam A is substantially parallel to the Y axis, although it may be made substantially parallel to the X axis. A modulating electric field, represented by the vector B, is substantially parallel to the Z axis and, therefore, substantially normal to the beam A. It is assumed that the entering beam A is plane-polarized in a direction so that it has a component z parallel to the Z axis and a component x parallel to the X axis. Due to the characteristics of the body 10, the $x$ electric vector component of the entering light beam A is propagated at a different velocity from its z component, even in the absence of the modulating electric field B. This is in contrast to the conventional use of solid-state electro-optical materials in which the beam travels in the Z direction and in which its $x$ and $y$ electric vector components have equal propagation velocities in the absence of the modulating electric field B. As a consequence, the beam $A_1$, emerging in the region 10b, in general, will be elliptically polarized, the orientation and eccentricity of the ellipse, that is the polarization parameters, being determined by the path length through the electro-optical material.

Application of the modulating electric field B affects, according to its strength, the propogation velocity of the $x$ component of the beam but not the velocity of its $z$ component. Thus, the parameters of the elliptical polarization of the emerging beam $A_1$ are affected by the strength of the modulating field B. By appropriately choosing the thickness of the body 10 and, if need be, by biasing it by choice of an appropriate constant component of the modulating field B, the condition corresponding to zero modulation may correspond to the emerging beam $A_1$, being plane-polarized either parallel or perpendicular to the polarization of the entering beam A.

For strong microwave frequency-modulating fields, dissipation of the microwave field energy in the body 10 may, in some cases, result in sufficient thermal expansion to vary significantly the relative phasing between the $x$ and $z$ components of polarization of the beam A, producing an undesirable modulation effect unrelated to the instantaneous strength of the modulating field. In cases where such thermal expansion is appreciable, its effect may be compensated for by the arrangement shown in FIG. 2 in which the beam A passes successively through two similar electro-optical bodies 10c and 10d so oriented that the beam is directed along the Y axis of the body 10c and the X axis of the body 10d, which the Z axis of the body 10d is perpendicular to the Z axis of the body 10c, both Z axes being transverse to the beam. The modulating fields B and $B_1$ of the electro-optical bodies 10c, 10d are parallel to their respective Z axis, the two fields being of equal amplitudes and in phase.

Figure 2:
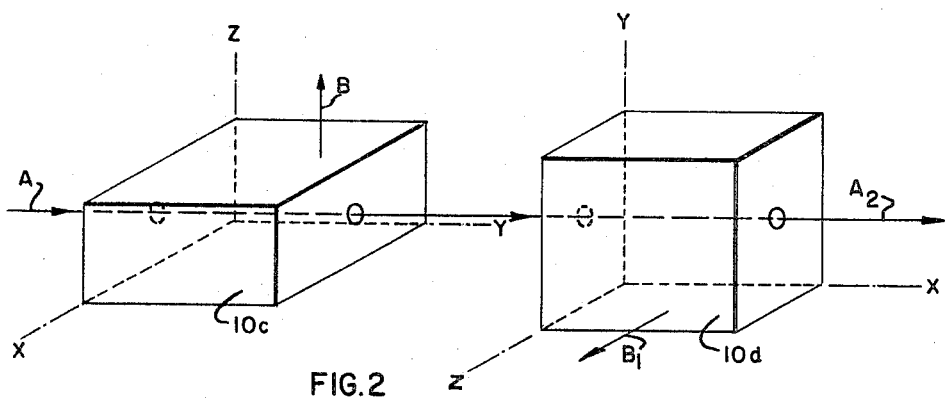
FIG. 2 is a schematic representation of a modified form of electro-optical modulator.

Since the refractive indexes of an X-polarized wave and of a Y-polarized wave are given equal and opposite increments by a given modulating electric field in the Z direction, it can be shown that the configuration of FIG. 2 results in phase differences between the respective emerging horizontally and vertically polarized components of the beam $A_2$ which are unaffected by thermal expansion but affected only by the electro-optical effect in the bodies 10c and 10d. That is, the thermal expansion has no net effect in producing a relative phase difference between the horizontally and vertically polarized components of the emerging beam $A_2$. In contrast to the effect of thermal expansion, the electro-optical effect produces in the horizontally and vertically polarized components of the emerging beam $A_2$ different net phase shifts as these traverse both of the bodies 10c and 10d.

The above methods of modification of the polarization parameters of the beam A may be utilized as described hereinafter.

The electro-optical modulator element schematically represented in FIG. 1 has a number of advantages. Since the beam travels normally to the modulating electric field, its path length across the electro-optical body is not limited to the distance between electrodes developing a modulating field, so that a weaker modulating field may be applied over a longer beam path length to produce a given differential phase retardation between the z-electric vector wave and the x-electric vector wave of the light beam. Moreover, the angular aperture over which the modulator will function is greater when used in the manner illustrated in FIG. 1 than when the beam is parallel to the Z axis, as in the conventional configuration. Specifically, much larger deviations of rays from the Y direction are permissible in the X, Y plane than are permissible from the Z direction. When used in the conventional manner, for the same total path length through the modulator body, permissible deviations from the Y direction in the Y, Z plane in the arrangement of FIG. 1 are comparable to permissible deviations from the Z direction. By the term "permissible deviation" is meant the largest angle of deviation of a ray from the average direction of the rays comprising the beam which still permits effectively uniform optical modulator action. Thus, a ray emerging from the modulator body at an angle greater than the largest permissible deviation angle may, for example, have a polarization at right angles to that of a ray emerging at zero deviation angle, zero deviation angle representing the average direction of the rays comprising the beam.

Because of the increased angular aperture, that is, the reduced parallelism requirement on the beam, the beam may be reduced by lenses to a smaller cross-section before entering the modulator body, which results in a reduced total volume of the modulator body for a given field strength and total beam path length and a closer spacing of the condenser plates which form the modulating field. Moreover, reduced volume of the modulator body for the same modulating field strength results in a reduced modulator power consumption and lower modulating voltages.

Figure 3:
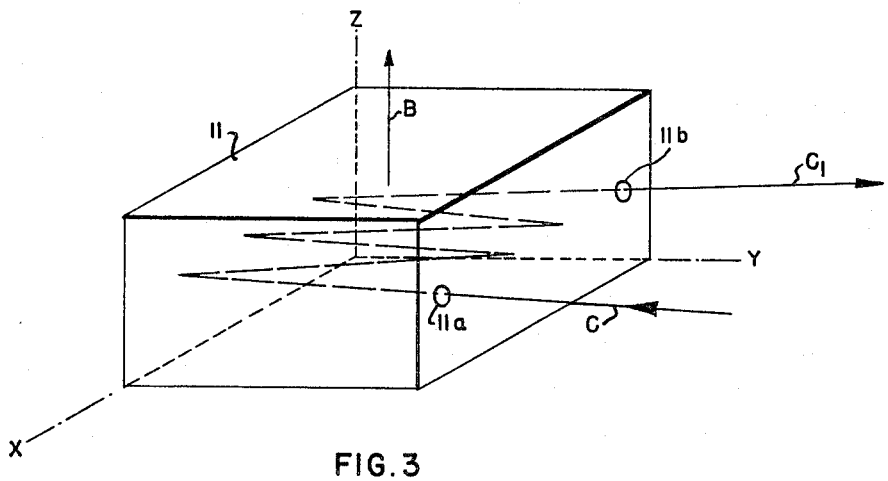

Referring now to FIG. 3, there is represented schematically an electro-optical modulator providing multiple reflections of the modulated beam. As illustrated, an electro-optical cell or body 11 is shown in reference to its principal axes X, Y, and Z. As illustrated, an entering light beam C is directed into the body 11 in the region 11a in a direction normal to the electric modulating field B, although the advantages of multiple reflection are also realized in an arrangement in which the entering beam C is essentially parallel to the modulating electric field. In this case, the end surfaces of the body 11 are assumed to be substantially completely reflective, as by suitable reflective coatings, and, after multiple reflections, the beam emerges as a beam $C_1$ from the region 11b of the electro-optical body.

The geometry illustrated in FIG. 1 essentially applies to the arrangement of FIG. 3, although the beam is no longer precisely parallel to the X or Y axis but rather makes a small angle in the X–Y plane to one of these axes. This small angle is necessary since the beam, upon successive reflections, must not retrace its previous path but each reflection must advance laterally in a sawtooth fashion.

While the arrangement of FIG. 3 is based on the use of a solid-state electro-optical body with the beam path normal to the modulating field, the multiple reflection feature of the invention is of general application to electro-optical modulators. For example, it may be applied to the prior conventional electro-optical modulator in which the beam, as well as the modulating field, are parallel to the Z axis. In this case, the sawtooth path of the beam would lie in a plane perpendicular to the X–Y plane with the beam segments at small angles to the Z axis. Alternatively, the multiple reflection feature of the invention may be applied to liquid electro-optical modulators, such as Kerr cells, in which the geometry would again be as shown in FIG. 3 though the X, Y, Z axes no longer denote crystal properties. Instead, the Z axis, which is parallel to the modulating field, becomes an axis of cylindrical symmetry of the optical properties of the liquid.

Figure 4:
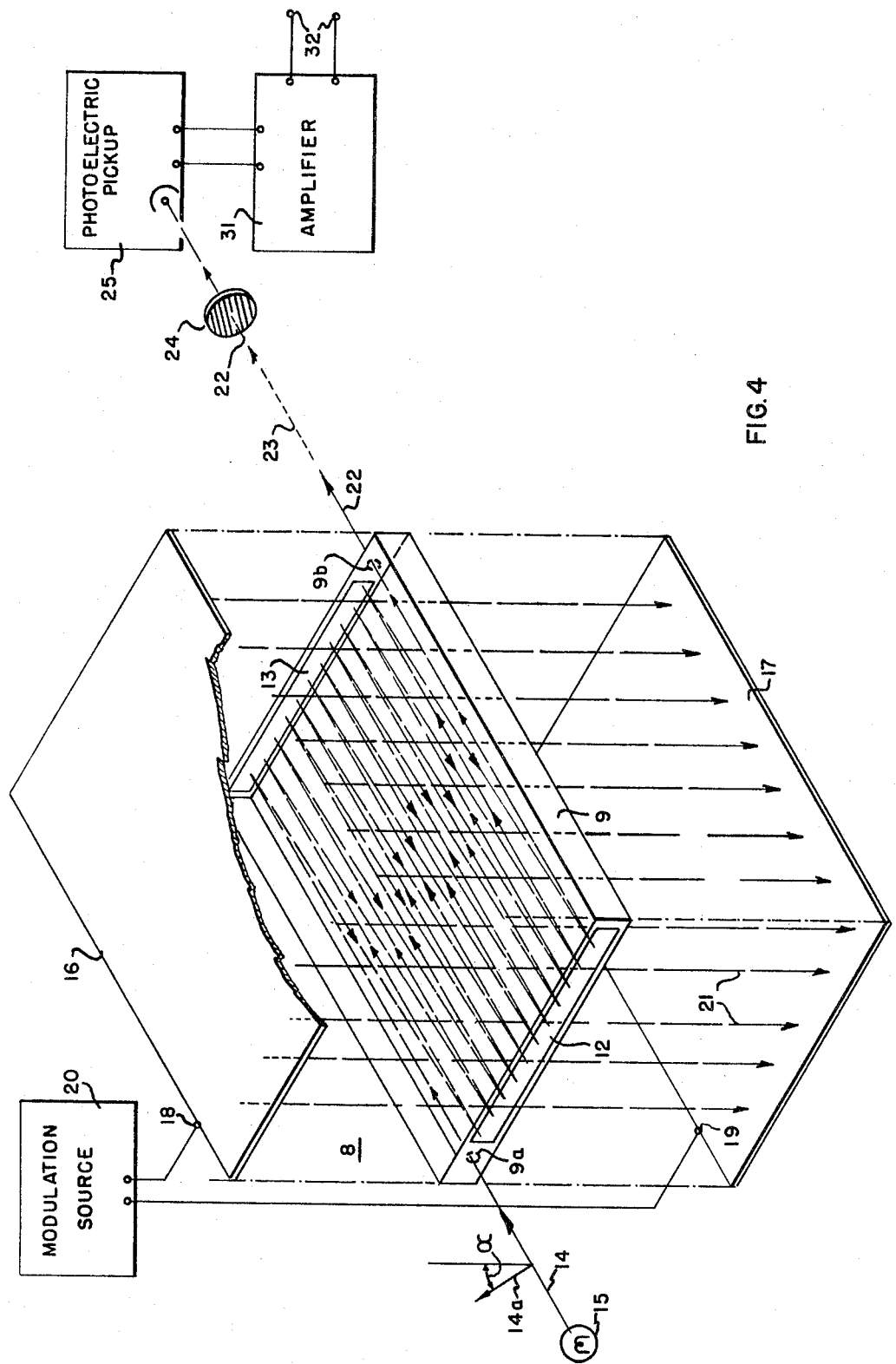
FIG. 4 is a schematic representation of a complete electro-optical communication system embodying the invention.

Referring now to FIG. 4 of the drawings, there is shown an exploded diagrammatic representation of an electro-optical communication system embodying the invention based upon the particular example shown in FIG. 3. The system of FIG. 4 comprises an electro-optical modulator 8 including a body 9 of transparent material having the property of birefringence varying with variations of an applied electric field. The electro-optical modulator further includes a pair of parallel plane reflecting surfaces 12 and 13 at either end of the body 9, such surfaces being approximately normal to the optical beam paths within the body. The surfaces 12 and 13 may be formed in any well-known manner, as, for example, by silvering the end surfaces of the body 9.

The electro-optical modulator 8 further includes means for directing a substantially parallel beam of light into the body 9 at a slight inclination to one of its index ellipsoid axes, whereby an entrant light beam undergoes multiple reflections by the reflecting surfaces 12, 13 before emerging from the body. Specifically, a light beam 14 from a light source indicated schematically at 15 is directed to an area 9a on the unsilvered end surface of the body 9 at a slight angle to its longitudinal axis so that it travels back and forth longitudinally through the body 9, as indicated, emerging from an area 9b in an unsilvered portion of the other end surface of the body 9. The light source 15 is one which develops a substantially parallel beam, for example an optical maser or laser. The number of reflections within the body is indicated schematically, a limit on the number of reflections for a given width is that the total time of transit of the multiply reflected light beam within the body 9 constitutes a period not substantially greater than one-half the period of the modulating frequency. Other limits are the degree of deviation from parallelism of the beam and, for solid materials, the homogeneity of the material. As indicated by the vector 14a, the incident light beam 14 from the source 15 is plane-polarized at an angle α relative to the normal of the body 9, such angle α preferably being of the order of 45°.

Advantages of employing multiple reflections rather than a single long path through the medium include the following: If the beam is essentially parallel to the modulating field, then the voltage between electrodes may be reduced by a factor equal to the number of beam traversals to produce a given optical effect. If the beam is normal to the modulating field, then edge effects associated with a long pair of parallel strips are largely obviated by using multiple reflections, which results in reducing the total amount of field energy required to produce a given optical effect. Also, crystals such as KDP and ADP are more easily grown in shapes of approximately equal X and Y dimensions than elongated shapes, the latter being required if multiple reflections are replaced by a single long path.

The electro-optical modulator 8 further includes means for applying an electric field within the body and varying in time in accordance with a desired modulating signal. In the case of a solid-state electro-optical body, the electric field may be either substantially parallel or normal to the path of the beam through the body, as shown. However, in the case of a fluid electro-optical body, the direction of the electric field will generally be essentially normal to the path. This field developing means may be in the form of a pair of conductive electrodes 16, 17 which, for clarity of illustration, have been separated from the body 9 but which will normally be disposed on opposite faces of the body 9 completely covering such faces. There are also provided input terminals 18, 19 connected to the electrodes 16, 17, respectively, and also to a modulation source 20 for impressing the modulating signal on the electrodes. The modulation source 20 thus applies an electric field, illustrated schematically by the dash lines 21, passing through the whole of the body 9. As explained previously, variations in the electric field produced by the modulation source 20 synchronously cause a change in the polarization parameters of the emergent light beam 22.

The communication system of the invention also includes a transmission link, specifically a path for the emergent light beam 22, indicated by the dotted-line path 23. The receiver of the communication system comprises a demodulator which includes means responsive to variations of the polarization parameters of the emergent light beam for detecting or recovering the modulating signal. Specifically, this may include means, such as a plane-polarizing Nicol prism 24 oriented at 45° to vertical, as indicated by the light shading, either parallel to or perpendicular to the polarization of the incident beam 14.

The demodulator further comprises means responsive to the output of the plane-polarizing prism 24 for recovering the modulating signal. The responsive means may be in the form of a photoelectric pickup unit 25 upon which the light beam passing through the prism 24 is impressed for developing an electrical signal representative thereof in any well-known conventional manner. The output of the photoelectric pickup unit 25 is connected to an amplifier 31 of conventional design having output terminals 32 at which appears an amplified signal representative of the modulation of the electric field 21, that is, of the signal from the modulation source 20.

It is believed the operation of the electro-optical communication system of the invention will be apparent from the foregoing description. Briefly, as the modulation signal from the source 20 varies in amplitude with time, the electric field represented by the lines of force 21 similarly varies in amplitude. This varying electric field correspondingly varies the polarization parameters of the incident light beam 14. Specifically, the beam 22 emerging from the modulator will, depending upon the particular modulating field strength, be plane-polarized in the original direction, plane-polarized at 90° to the original direction, or elliptically polarized with the major axis of the ellipse at intermediate angles. The action of the field is cumulative upon the light beam during its multiple reflections through the body 9, the plane reflecting surfaces 12 and 13 having no effect on the plane of polarization. The Nicol prism 24, as is well known, passes only those components of the light beam 22 which are polarized at 45°, as shown. Therefore, as the eccentricity and orientation of the major axis of the elliptical polarization of the incident light beam 22 vary and as the length of the major axis also varies, greater or lesser parts of the beam 22 will be transmitted through the element 24. The variations in output of the element 24 produce corresponding variations in the electrical signal output of the photoelectric pickup unit 25 and these variations are amplified in the amplifier 31 and appear at the output terminals 32.

Thus, the signal from the modulation source 20 is transmitted via the communication system of the invention and reappears in amplified level at the terminals 32 or at a level which compensate, in whole or in part, for the attenuation of the light beam over the link 23. By the use of the invention and the multiple reflections of the light beam 14 within the body 9, a substantial percentage modulation of the light beam is effected in a modulator element of practical physical dimensions and with the use of a modulating field of reasonable intensity. Though the demodulating prism has been shown as a portion of the receiver of the communication system, alternatively it may be located near the modulator. With such an arrangement, the transmitted light beam is plane-polarized in the plane of the prism 24 and varies in amplitude in consonance with the signal from the source 20.

While there have been described what are, at present, considered to be the preferred embodiments of the invention, it will be obvious to those skilled in the art that various changes and modifications may be made therein without departing from the invention and it is, therefore, aimed in the appended claim to cover all such changes and modifications as fall within the true spirit and scope of the invention.

What is claimed is:

In an electro-optical communication system, an electro-optical modulator comprising:
(a) an elongated plate-like body of solid-state transparent material having birefringence which varies with variations of an applied electric field;
(b) a pair of parallel plane surfaces, one at either end of said body;
(c) opaque conductive reflecting electrodes covering said surfaces, each having a window therein;
(d) means for directing a substantially parallel beam of light into said body through one of said windows at a slight inclination to one of its index ellipsoid axes and to said surfaces, whereby an entrant light beam undergoes multiple reflections by said surfaces before emerging from said body through the other of said windows;
(e) and input terminals for applying an electric signal to said electrodes varying in time in accordance with a desired modulating signal.

References Cited

UNITED STATES PATENTS

| | | | |
|---|---|---|---|
| 1,278,026 | 9/1918 | Salto | 88—1 |
| 2,467,325 | 4/1949 | Mason | 88—61 |
| 2,766,659 | 10/1956 | Baerwald | 88—61 |
| 2,788,710 | 4/1957 | West | 88—61 |
| 3,153,691 | 10/1964 | Kibler | 250—199 X |
| 3,158,746 | 11/1964 | Lehavec | 250—199 |
| 3,239,671 | 3/1966 | Buhrer | 250—199 |

OTHER REFERENCES

Cifton et al.: "A Ruby Laser With an Elliptic Configuration," Proc. I.R.E., May 1961, pp. 960–961.

JOHN W. CALDWELL, *Acting Primary Examiner.*